(12) United States Patent
Lee (10) Patent No.: US 8,677,441 B2
(45) Date of Patent: Mar. 18, 2014

(54) SCANNING ALGORITHM FOR EMBEDDED NETWORK DEVICES

(75) Inventor: Ronald Lee, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 184 days.

(21) Appl. No.: 13/403,144

(22) Filed: Feb. 23, 2012

(65) Prior Publication Data

US 2013/0222700 A1    Aug. 29, 2013

(51) Int. Cl.
*H04N 7/173* (2011.01)
(52) U.S. Cl.
USPC .......................................... 725/127; 725/128
(58) Field of Classification Search
None
See application file for complete search history.

(56) References Cited

U.S. PATENT DOCUMENTS

| | | | | |
|---|---|---|---|---|
| 6,104,908 | A * | 8/2000 | Schaffner et al. | 725/78 |
| 6,791,995 | B1 * | 9/2004 | Azenkot et al. | 370/436 |
| 6,954,446 | B2 * | 10/2005 | Kuffner | 370/335 |
| 8,370,890 | B2 * | 2/2013 | Wilson et al. | 725/127 |
| 8,381,250 | B2 * | 2/2013 | Tjio et al. | 725/63 |
| 2005/0094744 | A1 * | 5/2005 | Ramachandran et al. | 375/316 |
| 2009/0165070 | A1 * | 6/2009 | McMullin et al. | 725/125 |

* cited by examiner

*Primary Examiner* — Brian Pendleton
*Assistant Examiner* — Fernando Alcon
(74) *Attorney, Agent, or Firm* — Bruce Greenhaus (57) ABSTRACT

A system and method is provided for selective filtering of transmissions based on information received from a tuner. An embedded diplexer in a consumer electronic device allows the device to be used in a variety of different signal environments. For example, a television with an embedded switching filter coupled to the television tuner is operable in environments where television signals are transmitted on frequencies up to 1 GHz and in environments where MoCA signals are transmitted on 1 GHz frequencies.

20 Claims, 9 Drawing Sheets

SCANNING ALGORITHM FOR EMBEDDED NETWORK DEVICES

TECHNICAL FIELD

The presently disclosed method and apparatus relates generally to signal filters, and more particularly, some embodiments relate to diplexers for transmission media with multiple coexisting communication types.

DESCRIPTION OF THE RELATED ART

A variety of communications systems may coexist on various communication media. For example, on a bounded medium, such as the coaxial cabling in a typical residence, networking communications may coexist with broadcast communications, such as television or satellite signals. One such network communications system that coexists with other signals on coax is a network implementing the Multimedia over Coax Alliance (MoCA) networking protocol.

Figure 1:
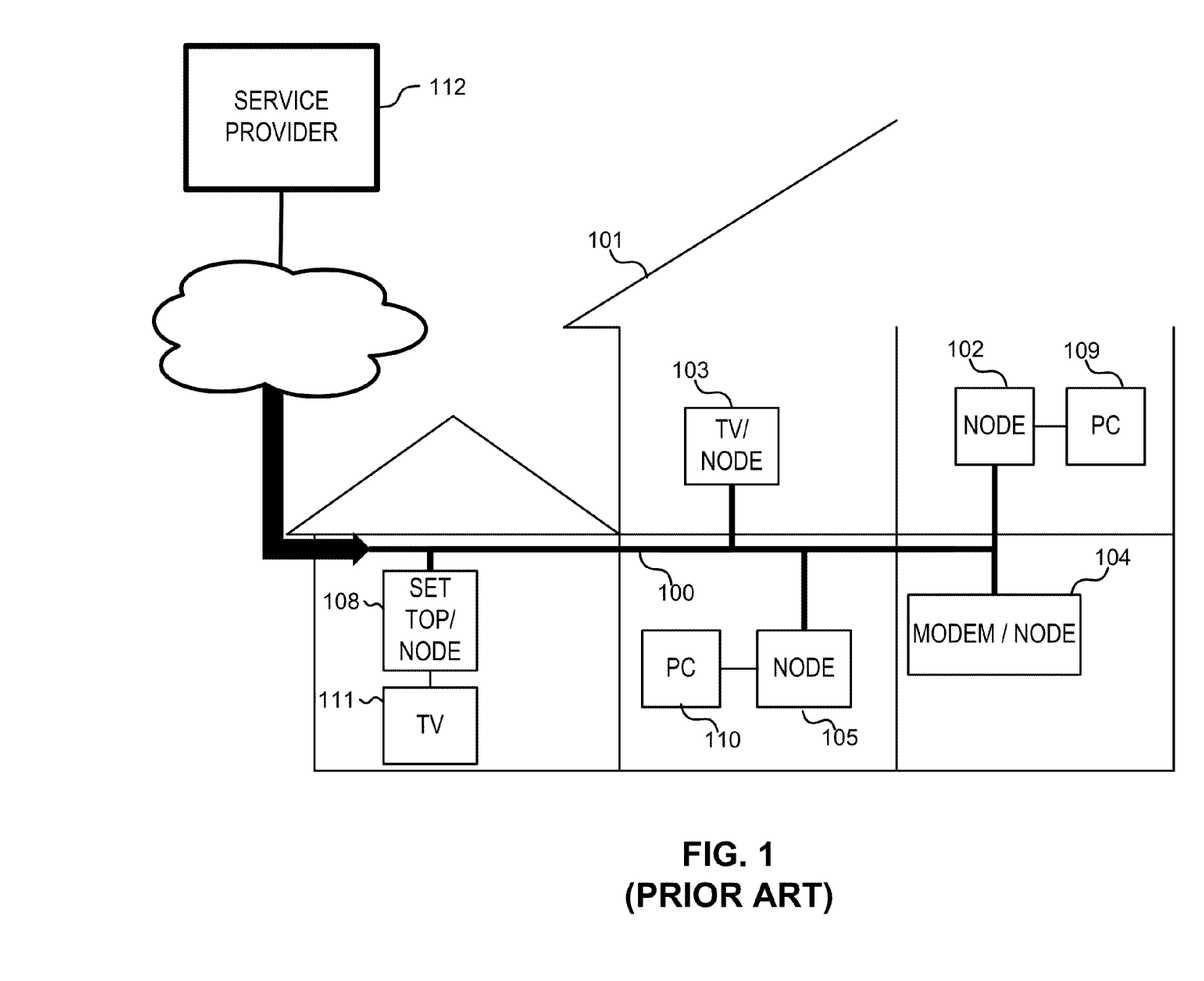
FIG. 1 illustrates one example of a Multimedia over Coax Alliance (MoCA) network implemented in a home.

The network of FIG. 1 is one example of a Multimedia over Coax Alliance (MoCA) network implemented in a home. In this example, a MoCA network is deployed on a wired communications medium 100. In MoCA networks, the medium 100 is a coaxial cable. In other environments, the medium 100 could be power line wiring, a fiber optic cable, an Ethernet cable, or other similar communications medium. In other environments, the communications medium 100 might be an air interface over a wireless transmission system. In a typical MoCA installation, the communications medium 100 is preinstalled coaxial cabling deployed within a residence 101.

The network of FIG. 1 comprises a plurality of network nodes 102, 103, 104, 105, 108 networked together according to a communications protocol. For example, the communications protocol might conform to a networking standard, such as the well-known MoCA standard. In the example of FIG. 1, the communications protocol specifies a packet based communications system.

The nodes in the illustrated network may serve various functions. In the illustrated example, nodes 102 and 105 are coupled to computers 109 and 110 to allow the computers 109 and 110 to communicate with other nodes on the network. A television 103 (or other network device) may have an integrated node to allow the television to receive and display media streamed from one or more other network nodes. For example, node 102 may be used to stream audiovisual media from the computer 109 to the television 103. The node 104 can also be associated with a module configured to interface with an internet service provider or a cable service provider 112, for example to provide Internet access, digital video recording capabilities, media streaming functions, or network management services to the residence 101.

The illustrated network may coexist with other communications systems. For example, a service provider 112 may transmit cable television transmissions on the medium 100. Alternatively, a satellite dish (not pictured) may provide satellite television transmissions on the medium 100. Consumer electronics devices, such as televisions 103 and 111, may be configured to receive these signals, either directly, or through an intermediary device, such as set top box 108. In typical environments, the coexisting communications systems use different frequencies to avoid interference. Some consumer electronic devices, like televisions 103 and 111 and set top boxes 108, may have the ability to communicate as a node on the network and to receive the television transmissions on medium 100.

Figure 2:
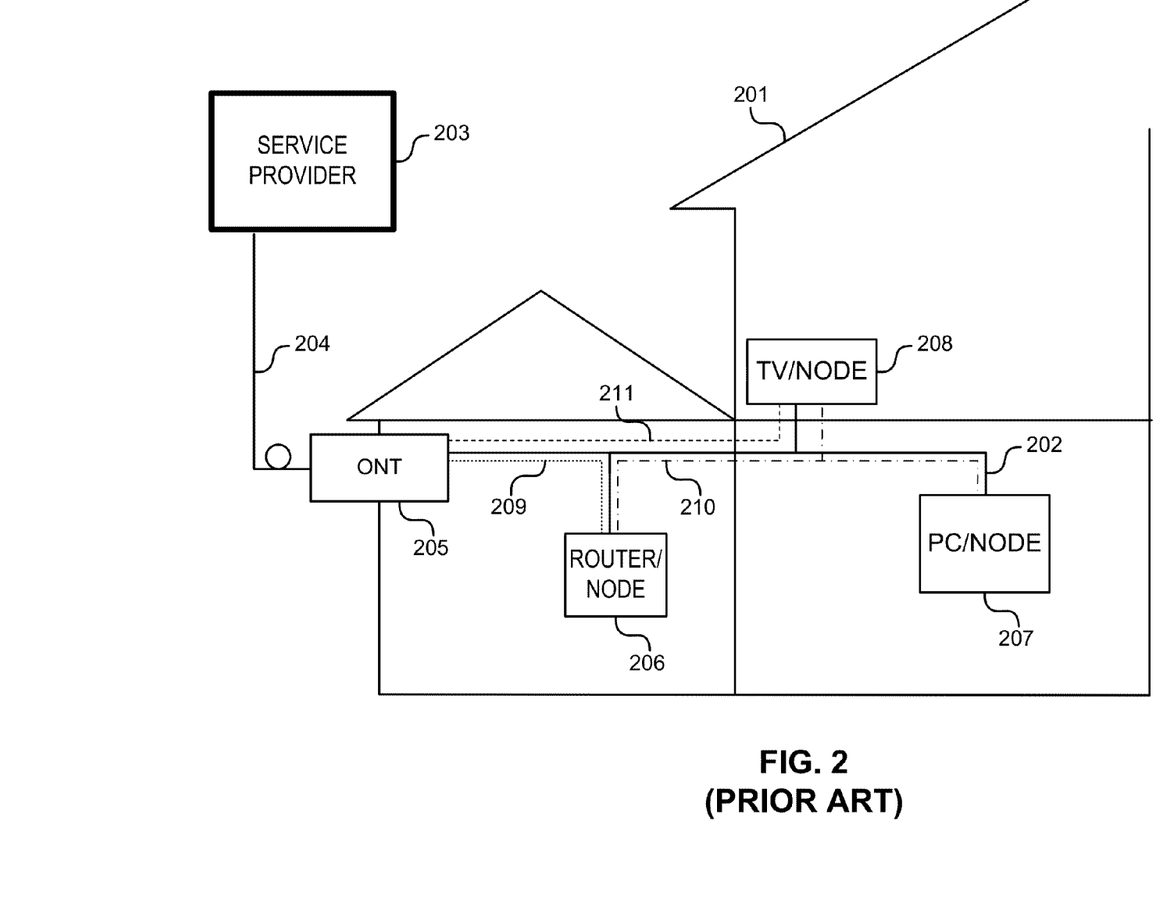
FIG. 2 illustrates a residential environment illustrating coexisting networks and television transmissions on a shared medium.

In some cases, multiple networks may coexist on the transmission medium in addition to the television transmissions. FIG. 2 is an example residential environment 201 illustrating this situation. In this environment, a service provider 203 provides broadcast signals and, in some cases, two-way data communications, such as telephone communications, Internet access, and video-on-demand, on a first transmission medium 204. In the illustrated embodiment, transmission medium 204 is a fiber optical line provided directly to the residence 201 and terminating at an optical network terminal (ONT) 205. A second transmission medium 202 interconnects the ONT 205 to other devices in the residence 201 and provides a transmission medium for network communications over a first network 209. In a typical environment, the first network 209 includes a router 206. The first network 209 is used to transmit data back to the service provider 203. The first network is reserved for communications between the router 206 and ONT 205 (and the service provider 203 through the ONT 205). The router 206 also acts as a node on a second network 210. The second network 210 interconnects the other network devices, such as a PC 207 (for example, connected to a network bridge, not shown) a television 208 that is either connected to node (not shown), or has node embedded (as shown in FIG. 2). The ONT 205 also provides television signals 211 on the medium 202. These signals are either provided to the television 208 or alternatively, to a set top box connected to the television 208.

Figure 3:
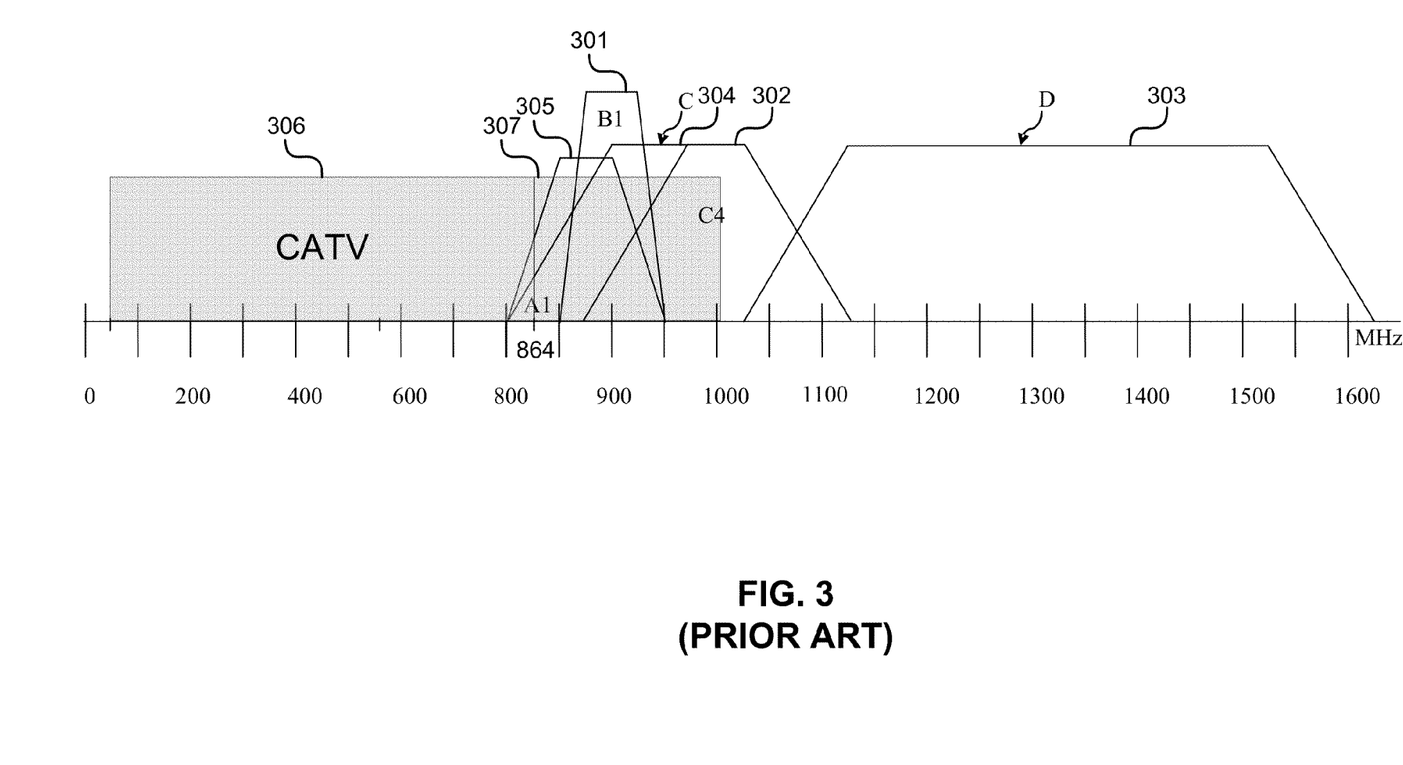
FIG. 3 illustrates the frequency usage possible in some different environments.

FIG. 3 illustrates how frequencies are allocated in a few different environments. This frequency diagram illustrates various MoCA channels in a typical environment with coexisting cable TV signals. Communications protocols often define various frequency channels for network communications. For example, the MoCA standard defines an A channel 305 centered at 875 MHz, a B channel 301 centered at 900 MHz, a plurality of C channels 304, including a C4 channel 302 centered at 1000 MHz, and a plurality of D channels 303 between 1125 MHz and 1525 MHz. Most cable services transmit at frequencies 306 between 54 MHz and 864 MHz. However, increasingly, cable services are being transmitted at frequencies 307 up to 1 GHz. As illustrated, some of these MoCA channels overlap with the bands used by some cable television providers.

Returning to FIGS. 1 and 2, in general, a consumer electronic device that has the ability to receive television transmission and to communicate over a network will not function in only one particular network environment. Rather, it is desirable for such a device to be compatible with several network environments. Such devices have embedded within them both tuners for receiving television transmissions and network nodes for communicating over networks. It is further desirable to provide only one connection to the transmission medium, for example through a single F-connector. Accordingly, diplexers are used to attenuate frequencies outside the operating range of the television tuner, so that the network communications do not interfere with reception of the television signals. However, such diplexers are complex, and so difficult and expensive to manufacture. Therefore, there is a need for a simple and inexpensive diplexer that can efficiently perform this function.

BRIEF SUMMARY OF EMBODIMENTS OF THE DISCLOSED METHOD AND APPARATUS

Various embodiments of the disclosed method and apparatus provide selective filtering of transmissions based on information received from a tuner. In these embodiments, an embedded diplexer in a consumer electronic device allows the device to be used in a variety of different signal environments. For example, a television with an embedded switching filter coupled to the television tuner is disclosed that will operate in environments in which television signals are transmitted on frequencies up to 1 GHz and in which MoCA signals are transmitted at frequencies equal to and greater than 1 GHz.

One disclosed method for filtering signals in a transmission medium having network signals coexisting with broadcast signals, comprises (a) a filter control module controlling a filter coupled to a tuner, the filter switchably attenuating network and broadcast signals above a first frequency or network and broadcast signals above a second frequency greater than the first frequency; (b) the filter control module receiving an indication that the tuner will tune to a broadcast signal channel between the first frequency and the second frequency; and (c) the filter control module controlling the filter to switch to attenuating signals above the second frequency in response to receiving the indication.

In other disclosed methods, the transmission medium is coaxial cabling. The network signals are MoCA signals and the broadcast signals are cable television signals. The first frequency is an upper frequency bound for cable signals provided by some service providers. The second frequency is an upper frequency bound for cable signals provided by other service providers. Additionally, the frequency range between the first frequency and the second frequency overlap with at least one MoCA channel.

Other features and aspects of the disclosed method and apparatus will become apparent from the following detailed description, taken in conjunction with the accompanying drawings, which illustrate, by way of example, the features in accordance with embodiments of the disclosed method and apparatus. The summary is not intended to limit the scope of the disclosed method and apparatus, which is defined solely by the claims attached hereto.

BRIEF DESCRIPTION OF THE DRAWINGS

The presently disclosed method and apparatus, in accordance with one or more various embodiments, is described in detail with reference to the following figures. The drawings are provided for purposes of illustration only and merely depict typical or example embodiments of the disclosed method and apparatus. These drawings are provided to facilitate the reader's understanding of the disclosed method and apparatus and shall not be considered limiting of the breadth, scope, or applicability of the disclosed method and apparatus. It should be noted that for clarity and ease of illustration these drawings are not necessarily made to scale.

The figures are not intended to be exhaustive or to limit the disclosed method and apparatus to the precise form disclosed. It should be understood that the disclosed method and apparatus can be practiced with modification and alteration, and that the invention be limited only by the claims and the equivalents thereof.

DETAILED DESCRIPTION OF SOME EMBODIMENTS OF THE DISCLOSED METHOD AND APPARATUS

The presently disclosed method and apparatus is a system and method for selective diplex filtering of broadcast signals based on information received from a tuner. This allows devices with embedded diplexers to operate in environments where network signals are transmitted in a particular frequency range and in environments where broadcast signals are transmitted in the particular frequency range. For examples, the devices may operate in environments where cable television signals are transmitted in the range between 825 MHz and 1 GHz and MoCA signals are transmitted in the range between 825 MHz and 1 GHz. In this disclosure the use of the term "tuner" refers broadly to the physical tuner itself and the tuner control subsystem.

Figure 4:
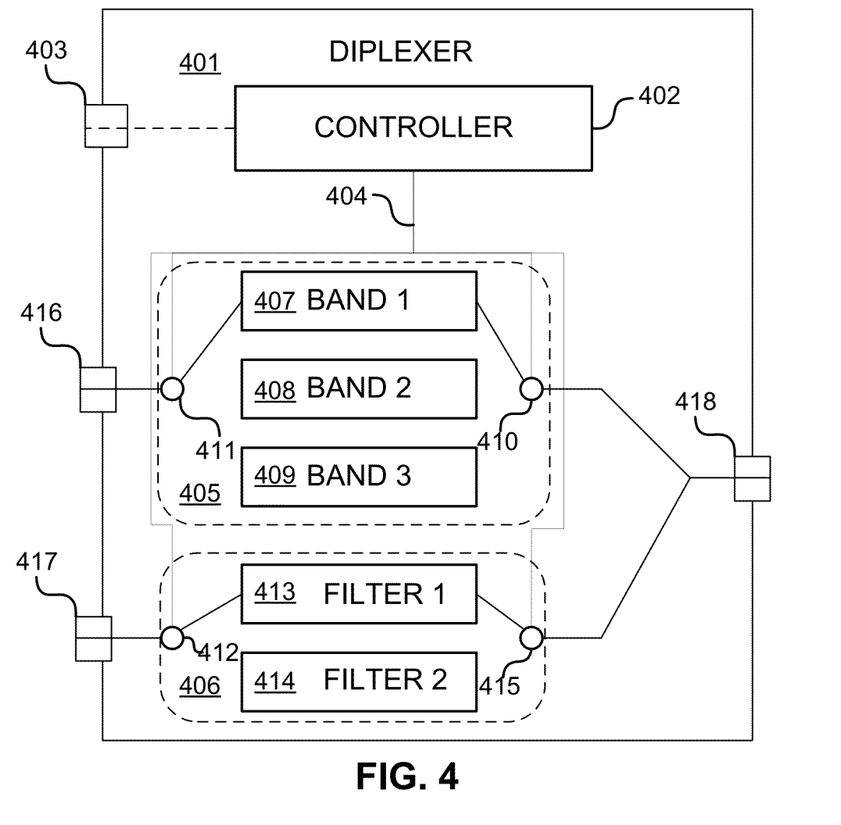
FIG. 4 illustrates a functional diagram of a diplexer implemented in accordance with an embodiment of the disclosed method and apparatus.

FIG. 4 illustrates a functional diagram of a diplexer implemented in accordance with an embodiment of the disclosed method and apparatus. The diplexer 401 comprises a filter control module 402. The filter control module 402 is coupled to a communications interface 403. The communications interface 403 is configured to be coupled to an external system to allow the control module 402 to receive operational information. In some embodiments, the communications interface 403 is coupled to a tuner, such that the control module 402 may receive information from the tuner, such as information about the frequency to which the tuner will be tuning.

The filter control module 402 is further coupled to signal lines 404 over which the module 402 sends signals to control the operation of the filters 405 and 406. The filter 405 is interposed between an input 418 and a network output 416. The filter 406 is interposed between an input 418 and a tuner output 417. The input 418 is configured to be coupled to the communications medium. For example, the input 418 may be coupled to a coaxial cable system. The network output 416 is configured to be coupled to a network node. The tuner output 417 is configured to be coupled to the input of a tuner configured to receive broadcast signals on different channels in the communication medium.

In the example illustrated in FIG. 4, filter 405 includes a plurality of bandpass filters 407, 408, 409 that are each configured to pass a predetermined band of a plurality of network signal bands. Control signals from the controller 402 are used to determine which of the filters 407, 408, 409 is selected, and therefore, which band of frequencies is passed to network output 416. Likewise, filter 406 includes a plurality of bandpass filters 413, 414, that are each configured to pass a predetermined band from among a plurality of broadcast signal bands. Control signals 404 from the controller 402 are used to determine which of the filters 413, 414 is selected, and therefore, which band of broadcast signals is coupled to the output 417.

The filter 405 is functionally illustrated as a set of bandpass filters 407, 408, and 409 selected by switches 411 and 410. The number of bandpass filters corresponds to the number of possible communications bands that networks may use on the medium. In the illustrated embodiment, the three band-pass filters 407, 408, and 409 allow communications on any one of three different communications bands. For example, in an embodiment implemented to allow MoCA signals to coexist with television signals, the first filter 407 might comprise a bandpass filter configured to pass the MoCA "D" band, which is frequently used with coexisting cable television signals. In this embodiment, the second filter 408 might comprise a bandpass filter configured to pass the MoCA "E" band, which is frequently used with coexisting satellite television signals. Finally, the third filter 409 might comprise a bandpass filter configured to pass the MoCA "F" band. Although functionally illustrated as a switchable bank of filters, as understood by one of ordinary skill in the art, filter 405 may be implemented in a variety of different ways.

In some embodiments, the filter 405 is configured to pass communication bands that are commonly used in local area networks (LANs) that a consumer may use. In some embodiments, the filter 405 is not configured to pass communications bands that are used for private network communications. For example, referring to FIG. 2, the filter 405 may not be configured to pass the communication band used for communications between an ONT 205 and a router 206, which may be reserved for the service provider's use. In other embodiments, the filter 405 may be configured to pass such private network communications bands.

The filter 406 is functionally illustrated as switchable set of filters 413 and 414. The first filter 413 is configured to attenuate signals outside of a first frequency range. The second filter 414 is configured to attenuate signals outside a second frequency range. In some embodiments, the second frequency range encompasses the first frequency range. For example, referring to FIG. 3, in one embodiment the first frequency range is a first cable TV signal range 306 and the second frequency range is the union of the first cable TV signal range 306 and the second cable TV signal range 307. In some embodiments, each filter 413 and 414 is a low pass filter, and the first and second frequency ranges arise from providing different cutoff frequencies. Filters 413 and 414 may also be band pass filters, high pass filters, or other filter types appropriate for reception of the broadcast signals. Some embodiments may include additional filters in filter bank 406, such as band pass or high pass filters for satellite TV signals.

Although filters 405, 406 are illustrated in this example as having three and two filters, respectively, filters 405, 406 can be implemented using different quantities of filters, depending on network requirements.

Figure 5A:
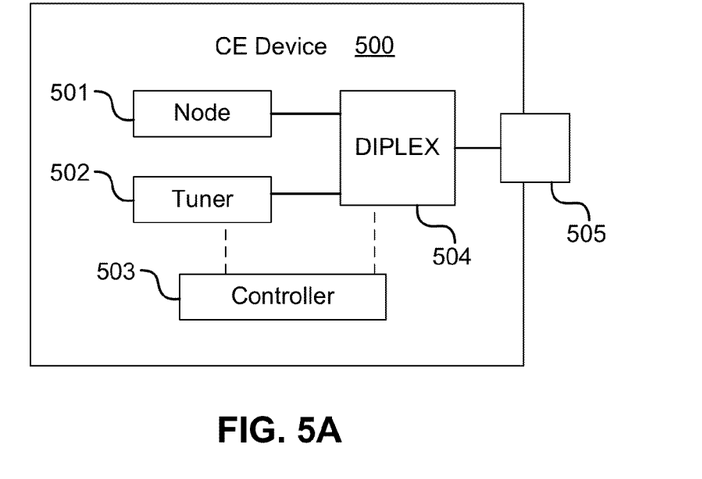
FIG. 5A illustrates a consumer electronic device with an integrated network node implemented in accordance with an embodiment of the disclosed method and apparatus.

FIG. 5A illustrates a consumer electronic device with an integrated network node implemented in accordance with an embodiment of the disclosed method and apparatus. In one embodiment, the consumer electronic device 500 comprises a television with integrated network capabilities. These integrated network capabilities are provided by network node 501. They allow the device 500 to perform various functions, such as streaming media from the Internet or a local network media server. Additionally, the device is able to display broadcast signals, such as television channels, using the tuner 502.

The network node 501 and tuner 502 share a common interface 505 with the medium. For example, the interface 505 may be an F connector for connecting the device 500 to a coaxial cable system. A Diplexer 504 filters the broadcast signals for the tuner 502 and filters the network signals for the network node 501. An example of a diplexer 504 is illustrated as the diplexer 401 in FIG. 4. In some embodiments, the diplexer 504 is configured to filter only the broadcast signals for the tuner 502 and to pass all signals to the node 501. In these embodiments, the node 501 is provided with band pass filters to filter the network signals itself.

The device 500 further comprises a controller 503. The controller 503 may perform various control functions in the device 500. In particular, the controller 503 controls the tuner 502 to cause the tuner 502 to tune to a particular channel. The controller 503 is further coupled to the diplexer 504 and provides channel selection information to the diplexer 504. In various embodiments, the channel selection information might comprise a specific channel, a band of channels, or a frequency range. The diplexer 504 uses the channel selection information to select which filter to use for the output to the tuner 502. In some embodiments, the diplexer 504 has a default state in which it uses the first filter to pass the first frequency range. When the diplexer 504 receives an indication that the tuner will tune to a broadcast channel outside the first frequency range, the diplexer 504 switches to the second filter.

Accordingly, the diplexer 504 enables the device 500 to be used in environments where there may be network communications (such as private network communications) within the second frequency range or where there may be broadcast signals within the second frequency range.

Figure 5B:
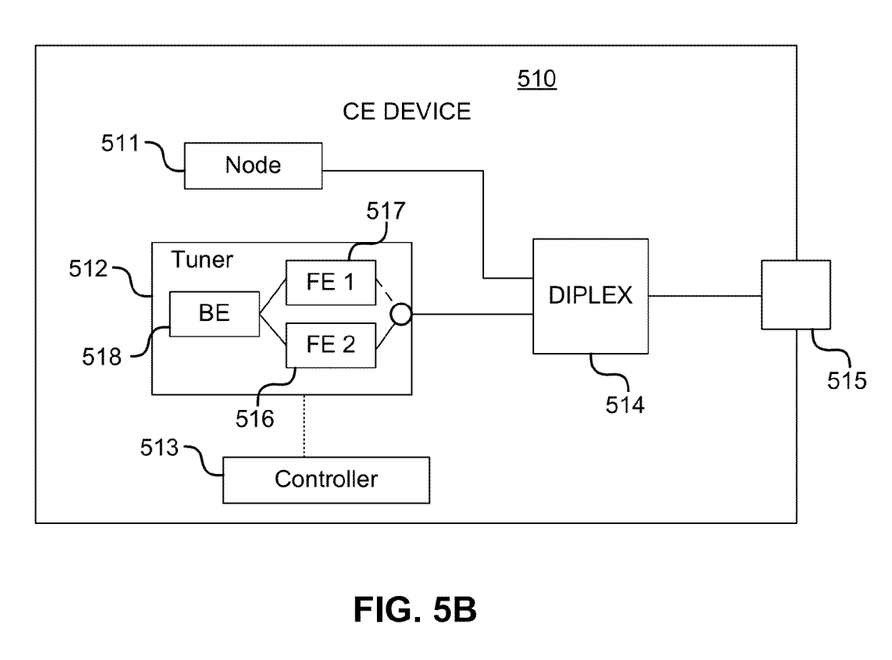
FIG. 5B illustrates a second consumer electronic device with an integrated network node implemented in accordance with an embodiment of the disclosed method and apparatus.

FIG. 5B illustrates a consumer electronic device with multiple tuner front ends implemented in accordance with an embodiment of the disclosed method and apparatus. Similar to the embodiment of FIG. 5A, the consumer electronic device 510 may comprise a television with integrated network capabilities. Here, these integrated network capabilities are provided by a network node 511 and may allow the device 510 to perform various functions, such as streaming media from the Internet or a local network media server. Additionally, the device 510 is able to display broadcast signals, such as television channels, using the tuner 512.

The network node 511 and tuner 512 share a common interface 515 with the medium. For example, the interface 515 may be an F connector for connecting the device 510 to a coaxial cable system. The diplexer 514 filters the broadcast signals for the tuner 512 and filters the network signals for the network node 511. In this embodiment, the output of the diplexer 514 that is coupled to the tuner 512 only attenuates signals beyond the greatest frequency bound for commonly used broadcast signals. For example, in one cable television system, the diplexer 514 attenuates signals beyond 1 GHz. In other embodiments, the diplexer 514 is either omitted or is replaced with a splitter.

In one embodiment, the tuner 512 has multiple front ends 517, 516. Each front end 517, 516 comprises a low pass filter (not shown) with a different cut off frequency. One filter (not shown) has a cut off frequency for a first group of broadcast signals, such as cable signals transmitted by a particular cable provider—for example, 864 MHz. The other filter (not shown) has a higher cut off frequency for another group of broadcast signals, such as cable signals transmitted by another cable provider—for example, 1 GHz. These front ends 517, 516 are switchably selected by the tuner 512 to connect to a common back end 518. Accordingly, in this embodiment, the tuner 512 operates as the filter control module upon receiving channel selection information from the device controller 513. As in other embodiments, the tuner 512 may have a default state using the first front end 517 and only switch to using the second front end 516 when necessary. Alternatively, the tuner 512 may select which front end 517 or 516 to use during normal operation based on a channel scan performed during set up.

Figure 6:
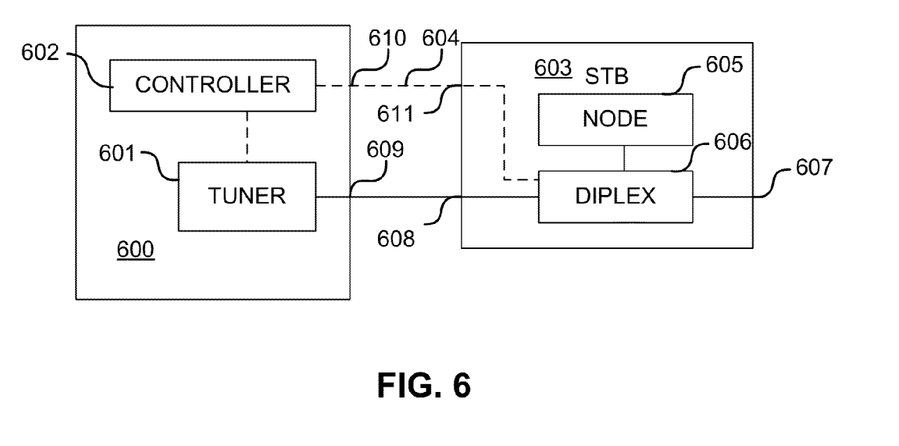
FIG. 6 illustrates a consumer electronic device coupled to a network node implemented in accordance with an embodiment of the disclosed method and apparatus.

FIG. 6 illustrates a consumer electronic device coupled to a network node implemented in accordance with an embodiment of the disclosed method and apparatus. The illustrated embodiment is similar to the one described with respect to FIG. 5, except that the network node 605 is external to the consumer device 600. For example, the node 605 may be integrated into a set-top box 603, or it may be a stand-alone external device. In the illustrated embodiment, the diplexer 606 is integrated into the set-top box 603 as well. The set-top box 603 is coupled to the shared communication medium using input 607, such as an F connector to a shared coaxial cable system.

Similar to the description above, the diplexer 606 filters the output 608 to attenuate possible network signals. Such filtering prevents interference with broadcast signal reception by the tuner 601. In some embodiments, the output 608 and input 609 use an equivalent connector system as input 607, such as the F connector system. The diplexer 606 also provides the network signals to the network node 605. In this embodiment, the controller 602 has an output 610 that allows it to transmit 604 information indicating when the tuner 601 will tune to a new channel and to which channel it will tune. The set-top box 603 has a corresponding input 611 allowing the diplexer 606 to receive the information. In some embodiments, the output 610 and input 611 may be Ethernet ports.

Figure 7:
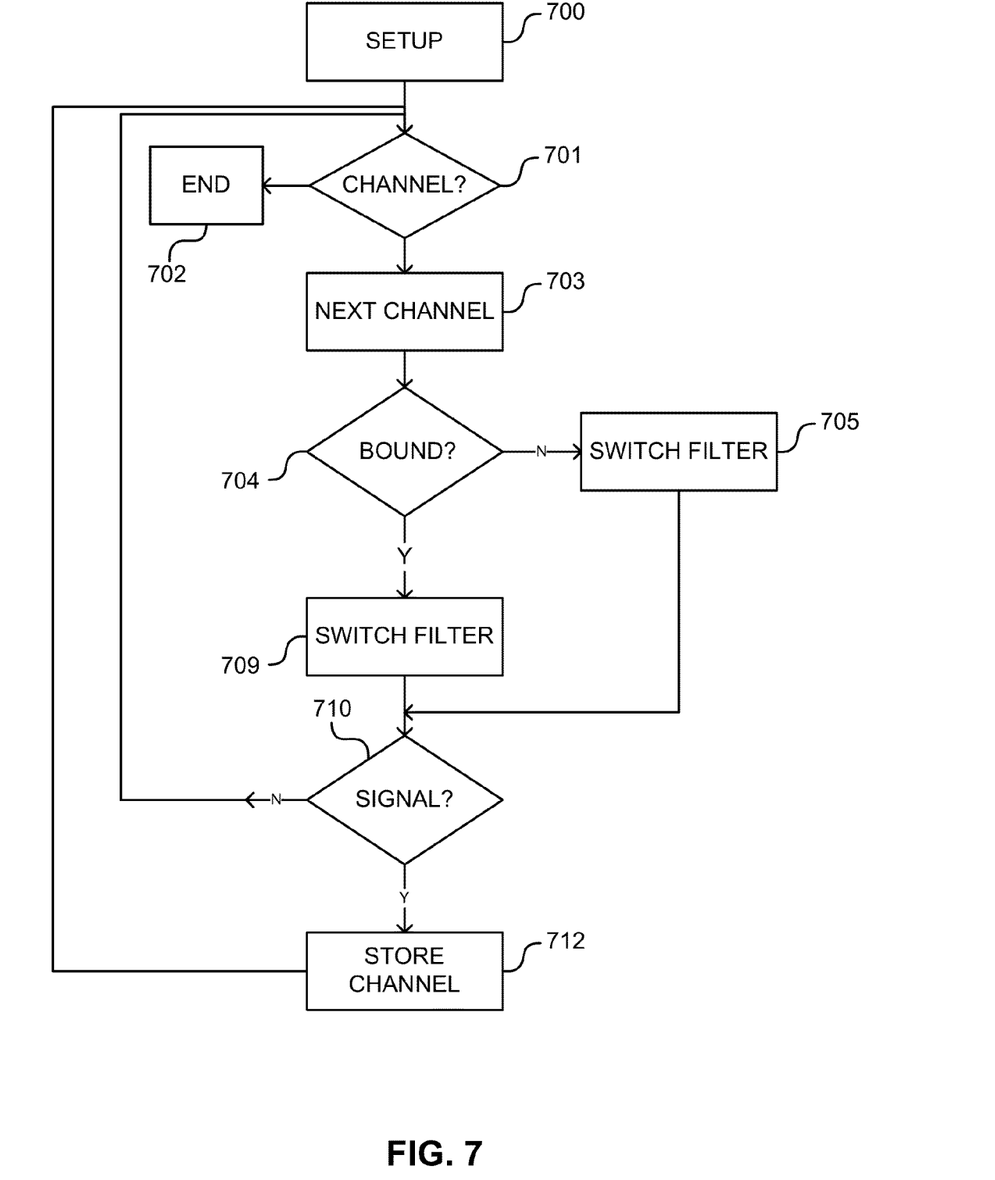
FIG. 7 illustrates a method of filtering signals implemented in accordance with an embodiment of the disclosed method and apparatus.

FIG. 7 illustrates a method of filtering signals implemented in accordance with an embodiment of the disclosed method and apparatus. The illustrated method is applied during a television channel setup procedure 700. The illustrated channel setup procedure is similar to a process in which a television cycles through possible television channels and stores in memory those channels that have tunable signals.

When the setup method begins (STEP 700), and after future iterations, the tuner determines if there are further channels to check (STEP 701). If not, the method ends (STEP 702). If so, the tuner proceeds to the next available channel (STEP 703). In some embodiments, the tuner transmits to a control module of a filter, an indication that the tuner will tune to the next available channel.

If the channel is within a frequency band encompassed by a passband of a first filter (STEP 704), then the filter control causes the filter to select a first filter (STEP 709). In some embodiments, if the previous channel was within the bound (STEP 704), then the filter simply continues using the first filter. If there is a signal (STEP 710), then the channel is stored in memory for future viewing (STEP 712). In some embodiments, an indication of which filter to use for receiving the channel is also stored in memory. The method then determines if further channels remain for scanning (STEP 701). If there is no signal (STEP 710), then the channel is not stored, and the method proceeds to STEP 701.

Returning to STEP 704, if the channel is outside the bound (STEP 704), then the filter control module causes the filter to select a second filter (STEP 705). In some embodiments, if the previous channel was outside the bound (STEP 704), then the filter simply continues using the second filter. Again, if there is a signal (STEP 710), then the channel—and possibly the associated filter—is stored for future viewing (STEP 712). The method then proceeds to STEP 701 to determine if further channels remain for scanning (STEP 701). If there is no signal (STEP 710), then the channel is not stored, and the method proceeds to STEP 701.

In some embodiments, if a channel was stored (STEP 712) that was outside the frequency bound for the first filter, then the filter continues using the second filter during normal operation until a subsequent setup procedure 700. In these embodiments, if no channel outside the first frequency bound was stored (STEP 712), then the filter uses the first filter until the subsequent setup procedure 700.

Figure 8:
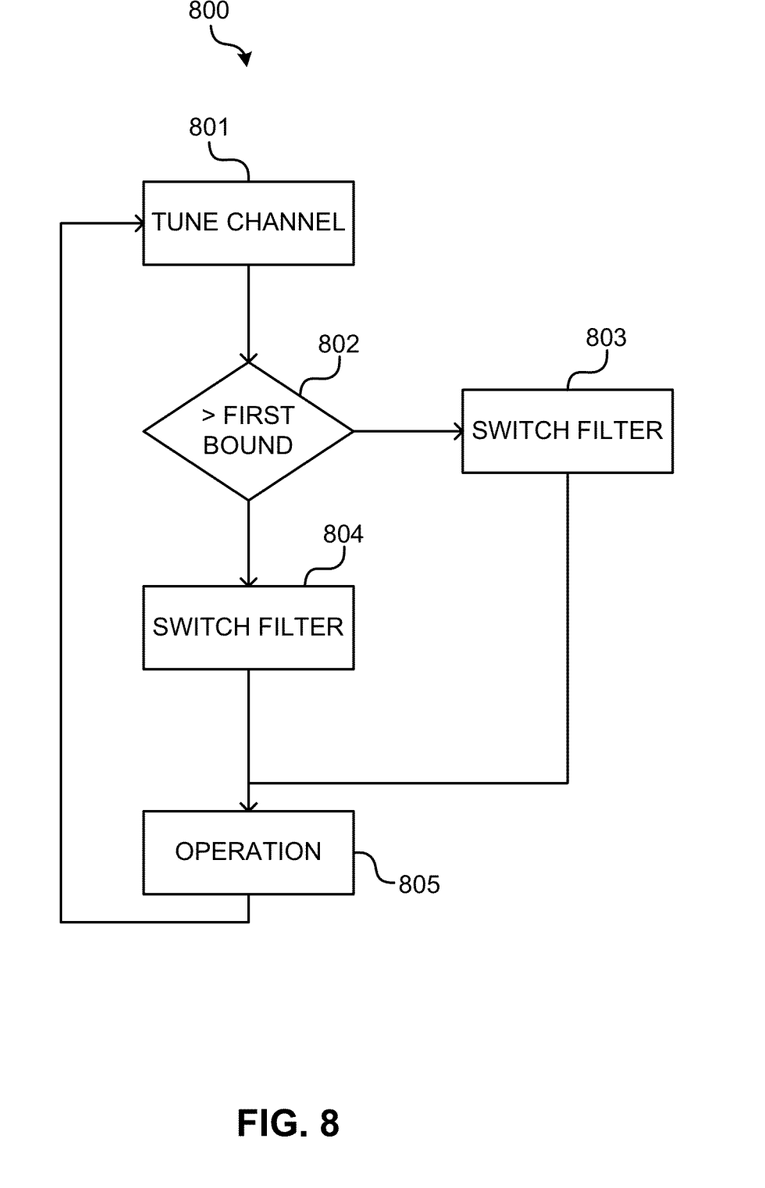
FIG. 8 illustrates a method of filtering signals implemented in accordance with an embodiment of the disclosed method and apparatus.

FIG. 8 illustrates a method of filtering signals implemented in accordance with an embodiment of the disclosed method and apparatus. The illustrated method illustrates a manner of signal filter during normal operation. In this embodiment, when the television tunes to a channel 801, an indication is sent to a filter control module coupled to the tuner. If the channel is within a predetermined frequency bound 802, then the filter switches to a first filter 804, and the television operates normally 805. If the channel is outside the predetermined frequency bound 803, then the filter switches to a second filter 803, and the television operates normally 805. In some embodiments, the filter remains using the last-used filter, and only switches if the new channel is within or outside the bound.

Figure 9:
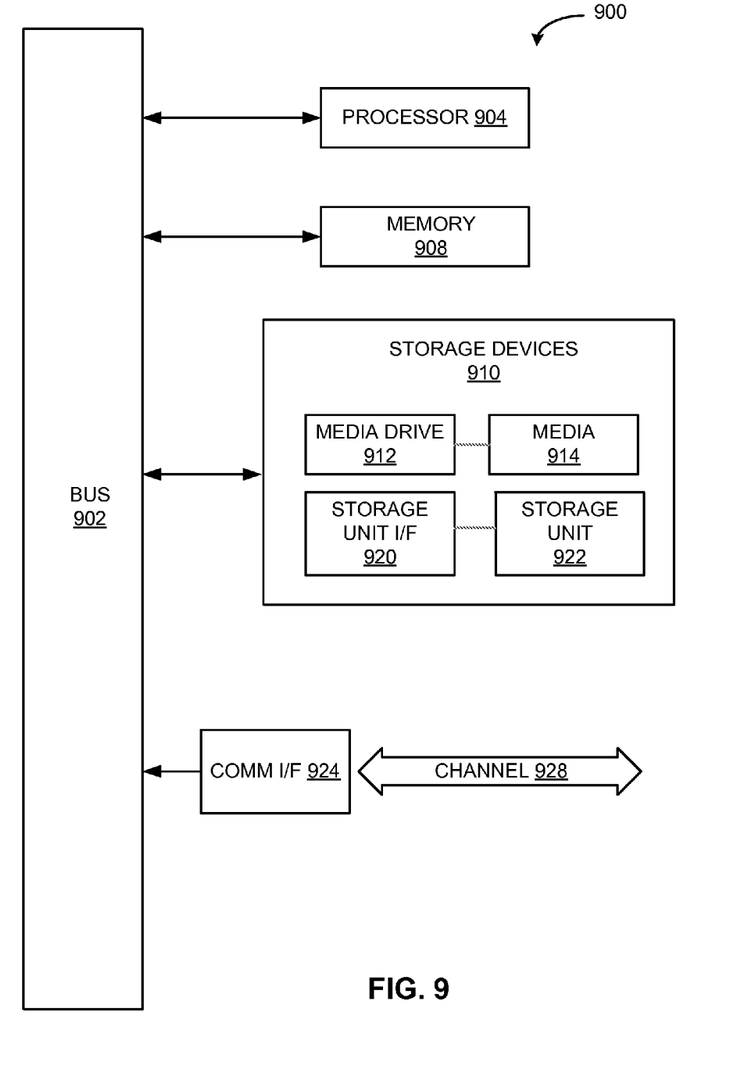
FIG. 9 illustrates an example computing module that may be used in implementing various features of embodiments of the disclosed method and apparatus.

As used herein, the term module might describe a given unit of functionality that can be performed in accordance with one or more embodiments of the presently disclosed method and apparatus. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the disclosed method and apparatus are implemented in whole or in part using software, in one embodiment, these software elements can be implemented to operate with a computing or processing module capable of carrying out the functionality described with respect thereto. One such example computing module is shown in FIG. 9. Various embodiments are described in terms of this example-computing module 900. After reading this description, it will become apparent to a person skilled in the relevant art how to implement the disclosed method and apparatus using other computing modules or architectures.

Referring now to FIG. 9, computing module 900 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 900 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 900 might include, for example, one or more processors, controllers, control modules, or other processing devices, such as a processor 904. Processor 904 might be implemented using a general-purpose or special-purpose processing engine such as, for example, a microprocessor, controller, or other control logic. In the illustrated example, processor 904 is connected to a bus 902, although any communication medium can be used to facilitate interaction with other components of computing module 900 or to communicate externally.

Computing module 900 might also include one or more memory modules, simply referred to herein as main memory 908. For example, preferably random access memory (RAM) or other dynamic memory, might be used for storing information and instructions to be executed by processor 904. Main memory 908 might also be used for storing temporary variables or other intermediate information during execution of instructions to be executed by processor 904. Computing module 900 might likewise include a read only memory ("ROM") or other static storage device coupled to bus 902 for storing static information and instructions for processor 904.

The computing module 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a floppy disk drive, a magnetic tape drive, an optical disk drive, a CD or DVD drive (R or RW), or other removable or fixed media drive might be provided. Accordingly, storage media 914 might include, for example, a hard disk, a floppy disk, magnetic tape, cartridge, optical disk, a CD or DVD, or other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing module 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory module) and memory slot, a PCMCIA slot and card, and other fixed or removable storage units 922 and interfaces 920 that allow software and data to be transferred from the storage unit 922 to computing module 900.

The computing module 900 might also include a communications interface 924. Communications interface 924 might be used to allow software and data to be transferred between computing module 900 and external devices. Examples of communications interface 924 might include a modem or soft modem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 924 might typically be carried on signals, which can be electronic, electromagnetic (which includes optical) or other signals capable of being exchanged by a given communications interface 924. These signals might be provided to communications interface 924 via a channel 928. This channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 900 to perform features or functions of the presently disclosed method and apparatus as discussed herein.

While various embodiments of the presently disclosed method and apparatus have been described above, it should be understood that they have been presented by way of example only, and not of limitation. Likewise, the various diagrams may depict an example architectural or other configuration for the disclosed method and apparatus, which is done to aid in understanding the features and functionality that can be included in the disclosed method and apparatus. The disclosed method and apparatus is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the presently disclosed method and apparatus. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed method and apparatus is described above in terms of various embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed method and apparatus, whether or not such embodiments are described and whether or not such features are presented as being a part of a described embodiment. Thus, the breadth and scope of the presently disclosed method and apparatus should not be limited by any of the above-described embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

The invention claimed is:

1. A method for filtering signals in a transmission medium having network signals coexisting with broadcast signals, comprising:
   (a) a filter control module controlling a filter coupled to a tuner, the filter switchably attenuating network and broadcast signals above a first frequency or network and broadcast signals above a second frequency greater than the first frequency;
   (b) the filter control module receiving an indication that the tuner will tune to a broadcast signal channel between the first frequency and the second frequency; and
   (c) the filter control module controlling the filter to switch to attenuating signals above the second frequency in response to receiving the indication;
   wherein the transmission medium is coaxial cable;
   the first frequency is an upper frequency bound for a first cable television broadcast system and the second frequency is an upper frequency bound for a second cable television broadcast system; and
   the frequency range between the first frequency and the second frequency overlaps with at least one MoCA channel.

2. The method of claim 1, further comprising:
   (a) the filter control module receiving an indication that the tuner will tune to a broadcast signal channel below the first frequency; and
   (b) the filter control module controlling the filter to switch the filter to attenuate signals above the first frequency.

3. The method of claim 1, further comprising:
   (a) the filter control module receiving an indication of whether the tuner detected a broadcast signal between the first frequency and the second frequency; and
   (b) if the tuner did not detect a signal between the first frequency and the second frequency, the filter control module controlling the filter to switch to attenuate signals below the first frequency.

4. The method of claim 3, wherein the steps (a)-(b) are performed during a set-up procedure, and the method further comprising the filter continuing to remain in a last switched state during normal operation.

5. The method of claim 1, wherein the filter control module is coupled to a second filter, the second filter configured to switchably pass one of a plurality of frequency bands for network communications.

6. The method of claim 5, wherein the filter control module is further coupled to a network node configured to communicate on one of the plurality of frequency bands.

7. The method of claim 1, wherein the filter control module, filter, and tuner are embedded in a consumer electronic device.

8. A system for filtering signals in a transmission medium having network signals coexisting with broadcast signals, comprising:
   (a) a filter control module coupled to a tuner; and
   (b) a filter coupled to and controlled by the filter control module, the filter switchably attenuating network and broadcast signals above a first frequency or signals above a second frequency greater than the first frequency; wherein,
   (c) the filter control module is configured to receive an indication that the tuner will tune to a broadcast signal channel between the first frequency and the second frequency; and
   (d) the filter control module is configured to control the filter to switch to attenuating signals above the second frequency in response to receiving the indication;
   wherein the transmission medium is coaxial cable;
   the first frequency is an upper frequency bound for a first cable television broadcast system and the second frequency is an upper frequency bound for a second cable television broadcast system; and
   the frequency range between the first frequency and the second frequency overlaps with at least one MoCA channel.

9. The system of claim 8, wherein the filter control module is further configured to:
   (a) receive an indication that the tuner will tune to a broadcast signal channel below the first frequency; and
   (b) control the filter to switch the filter to attenuate signals above the first frequency range.

10. The system of claim 8, wherein the filter control module is further configured to:
    (a) receive an indication of whether the tuner detected a broadcast signal between the first frequency and the second frequency; and
    (b) if the tuner did not detect a signal between the first frequency and the second frequency, control the filter to switch the filter to attenuate signals below the first frequency.

11. The system of claim 10, wherein the steps (e)-(f) are configured to be performed during a set-up procedure, and wherein the filter is configured to remain in a last switched state during normal operation.

12. The system of claim 8, wherein the filter control module is coupled to a second filter, the second filter configured to switchably pass one of a plurality of frequency bands for network communications.

13. The system of claim 12, wherein the filter control module is further coupled to a network node configured to communicate on one of the plurality of frequency bands.

14. The system of claim 8, wherein the filter control module, filter, and tuner are embedded in a consumer electronic device.

15. A consumer electronic device, comprising:

(a) a tuner configured to tune to broadcast signal channels received over a transmission medium;

(b) a filter control module coupled to the tuner; and (c) a filter coupled to and controlled by the filter control module, the filter switchably attenuating network and broadcast signals above a first frequency or signals above a second frequency greater than the first frequency; wherein, (d) the filter control module is configured to receive an indication that the tuner will tune to a broadcast signal channel between the first frequency and the second frequency; and (e) the filter control module is configured to control the filter to switch to attenuating signals above the second frequency in response to receiving the indication;

wherein the transmission medium is coaxial cable;

the first frequency is an upper frequency bound for a first cable television broadcast system and the second frequency is an upper frequency bound for a second cable television broadcast system; and the frequency range between the first frequency and the second frequency overlaps with at least one MoCA channel.

16. The device of claim 15, wherein the filter control module is further configured to:

(a) receive an indication that the tuner will tune to a broadcast signal channel below the first frequency; and (b) control the filter to switch the filter to attenuate signals above the first frequency.

17. The device of claim 15, wherein the filter control module is further configured to:

(a) receive an indication of whether the tuner detected a signal outside the first frequency range but within the second frequency range; and (b) if the tuner did not detect a signal outside the first frequency range but within the second frequency range, control the filter to switch the filter to attenuate signals outside the first frequency range.

18. The device of claim 17, wherein the steps (f)-(g) are configured to be performed during a set-up procedure, and wherein the filter is configured to remain in a last switched state during normal operation.

19. The device of claim 15, wherein the filter control module is coupled to a second filter, the second filter configured to switchably pass one of a plurality of frequency bands for network communications.

20. The device of claim 19, further comprising network node coupled to the filter control module and configured to communicate on one of the plurality of frequency bands.

* * * * *